United States Patent
Flick

(10) Patent No.: US 8,029,663 B2
(45) Date of Patent: Oct. 4, 2011

(54) TREATMENT DEVICE FOR MAGNETICALLY TREATING LIQUID IN A CONTAINER AND HAVING AN ASSOCIATED TIMER

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 882 days.

(21) Appl. No.: 12/042,877

(22) Filed: Mar. 5, 2008

(65) Prior Publication Data

US 2009/0223879 A1   Sep. 10, 2009

(51) Int. Cl.
- B01D 35/06 (2006.01)
- B03C 1/02 (2006.01)
- C02F 1/48 (2006.01)
- C12H 1/00 (2006.01)

(52) U.S. Cl. .......... 210/85; 210/138; 210/222; 210/695; 99/277.1

(58) Field of Classification Search ................. 99/277.1; 210/85, 138, 222, 695
See application file for complete search history.

(56) References Cited

U.S. PATENT DOCUMENTS

| | | | |
|---|---|---|---|
| 4,872,401 A | 10/1989 | Lee | 99/275 |
| 5,647,974 A * | 7/1997 | Shim et al. | 210/222 |
| 5,860,353 A | 1/1999 | Ceccarani | 99/277.1 |
| 6,287,614 B1 | 9/2001 | Peiffer | 426/237 |
| 6,325,942 B1 | 12/2001 | Freije, III | 210/695 |
| 6,390,319 B1 | 5/2002 | Yu | 220/230 |
| D500,118 S | 12/2004 | Flick | D23/207 |
| D511,198 S | 11/2005 | Flick | D23/207 |
| 6,959,640 B2 | 11/2005 | Flick | 99/277.1 |
| 2007/0108144 A1 | 5/2007 | Flick | 211/74 |
| 2009/0230032 A1 * | 9/2009 | Flick | 210/85 |

* cited by examiner

*Primary Examiner* — David A Reifsnyder
(74) *Attorney, Agent, or Firm* — Allen, Dyer, Doppelt, Milbrath & Gilchrist, P.A.

(57) ABSTRACT

A treatment device is for magnetically treating liquid in a liquid container. A container holder receives the liquid container. At least one permanent magnet is associated with the container holder to generate a magnetic field within the liquid in the liquid container. A treatment timer is associated with the container holder.

38 Claims, 4 Drawing Sheets

TREATMENT DEVICE FOR MAGNETICALLY TREATING LIQUID IN A CONTAINER AND HAVING AN ASSOCIATED TIMER

FIELD OF THE INVENTION

The present invention relates to the field of magnetic treatment, and more particularly, to the field of magnetically treating liquids to change properties thereof and associated methods.

BACKGROUND OF THE INVENTION

It is recognized that the flavor of some beverages may be enhanced by exposure to a magnetic field, which alters the molecular properties. U.S. Pat. No. 6,287,614 to Peiffer, for example, describes reducing the sensory perception of acids and tannins in alcoholic beverages by treating the beverage with a magnetic field. This treatment is asserted to give the alcoholic beverage a more aged flavor.

Accordingly, a number of products have been developed to expose beverages to magnetic fields to enhance flavor. Some of these products also attempt to enhance user convenience when magnetically treating beverages. For example, U.S. Pat. No. 4,872,401 to Lee discloses a container including surrounding sidewalls that have a plurality of magnets mounted on the inner side of the surrounding sidewalls to improve the flavor of fermented substances, such as wine, sauce, and tobacco. Another example is illustrated in U.S. Pat. No. 6,390,319 to Yu, which discloses a beverage magnetizing container that exposes a beverage within the container to a magnetic field to promote preservation. The magnetic field is created by permanent magnets in the sidewalls, base, or cap of the container.

Other products magnetically treat beverages during initial processing. For example, U.S. Pat. No. 6,325,942 to Freije, III discloses a liquid treatment unit that includes a pipe having a plurality of magnets coupled thereto. The magnets treat liquid as it passes through the pipes. U.S. Pat. No. 5,860,353 to Ceccarani discloses an apparatus for accelerating the aging of alcoholic beverages. The apparatus exposes beverages to low-frequency polarized pulsating magnetic fields.

One shortcoming with several of these devices is that the container with its integral magnets must contact the beverage to be treated. In other words, the user must pour the beverage to be treated into the specialized container for treatment prior to consuming the beverage. These specialized containers may increase the cost of magnetically treating beverages and may also decrease consumer flexibility.

Significant advances in the area of magnetically treating materials are disclosed in U.S. Pat. Nos. 6,959,640; D511, 198; D500,118; and Published U.S. Patent Application No. 2007/0108144 and assigned to Omega Patents, L.L.C., the assignee of the present invention, the entire contents of which are incorporated herein by reference. However, some users may desire additional features and/or convenience.

SUMMARY OF THE INVENTION

In view of the foregoing background, it is therefore an object of the present invention to provide a treatment device for magnetically treating liquids that provides the user with additional features.

This and other objects, features, and advantages in accordance with the present invention are provided by a treatment device for magnetically treating liquid in a liquid container comprising a container holder to receive the liquid container. At least one permanent magnet may be associated with the container holder to generate a magnetic field within the liquid in the liquid container. Furthermore, a treatment timer may be associated with the container holder. The treatment timer may permit the user to time the treatment, for example.

The treatment timer may include timer circuitry and at least one switch cooperating with the timer circuitry to assist a user in timing a duration of treatment of liquid within the liquid container. In some embodiments, the least one switch comprises at least one of a start/stop switch and a reset switch. The at least one switch may comprise at least one manually activated switch. Alternatively, the at least one switch may be activated based upon movement of the liquid container.

At least one indicator may be coupled to the timer circuitry. The at least one indicator may be an audible indicator or a visual indicator, for example. The visual indicator may display at least fractions of a second, such as milliseconds that continually update, to thereby generate visual interest in the treatment device.

The container holder may comprise a base and a plurality of members extending upwardly from the base. The members may be arranged in spaced-apart relation to receive the container of liquid. In some embodiments, the at least one permanent magnet comprises a plurality thereof. Accordingly, each of the plurality of members may carry a respective one of the plurality of permanent magnets. In other embodiments, the base may carry the at least one permanent magnet.

In yet another embodiment, the container holder may comprise a rack defining a plurality of container holding positions for holding a plurality of liquid containers. Each of the plurality of container holding positions may carry a respective permanent magnet of the plurality thereof.

Alternatively, the container holder may comprise at least one figurine. The at least one figurine may include a body portion and at least one limb extending outwardly therefrom. The at least one permanent magnet may be carried by at least one of the body portion and the at least one limb.

Another aspect of the invention relates to a method for making a treatment device for magnetically treating liquid in a liquid container. The method may include configuring a container holder to receive the liquid container. The method may also include associating at least one permanent magnet with the container holder to generate a magnetic field within the liquid in the liquid container. Moreover, the method may also comprise associating a treatment timer with the container holder.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notation are used to indicate similar elements in alternate embodiments.

Figure 1:
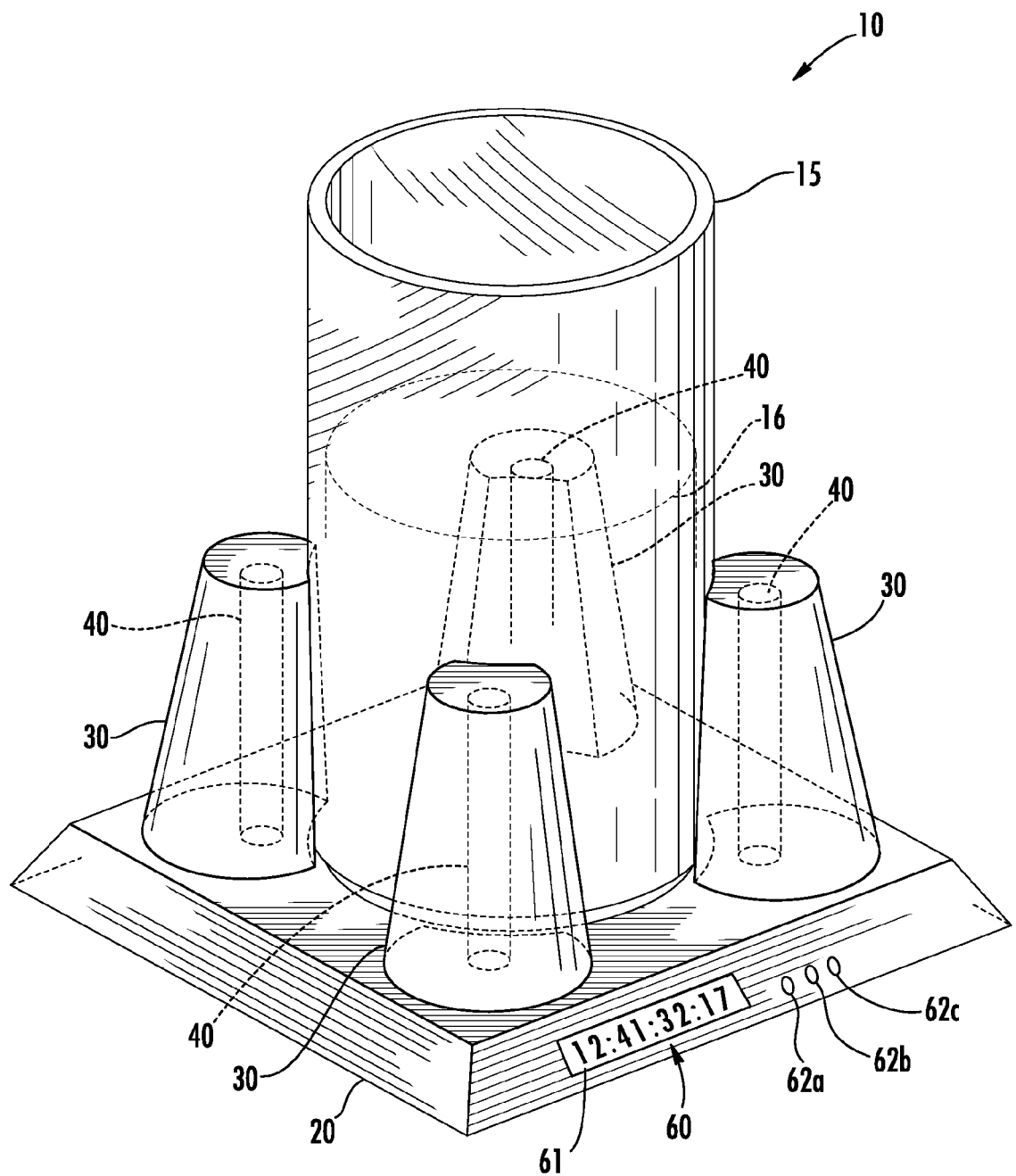
FIG. 1 is a perspective view of a treatment device for magnetically treating liquid in accordance with the present invention.
Figure 2:
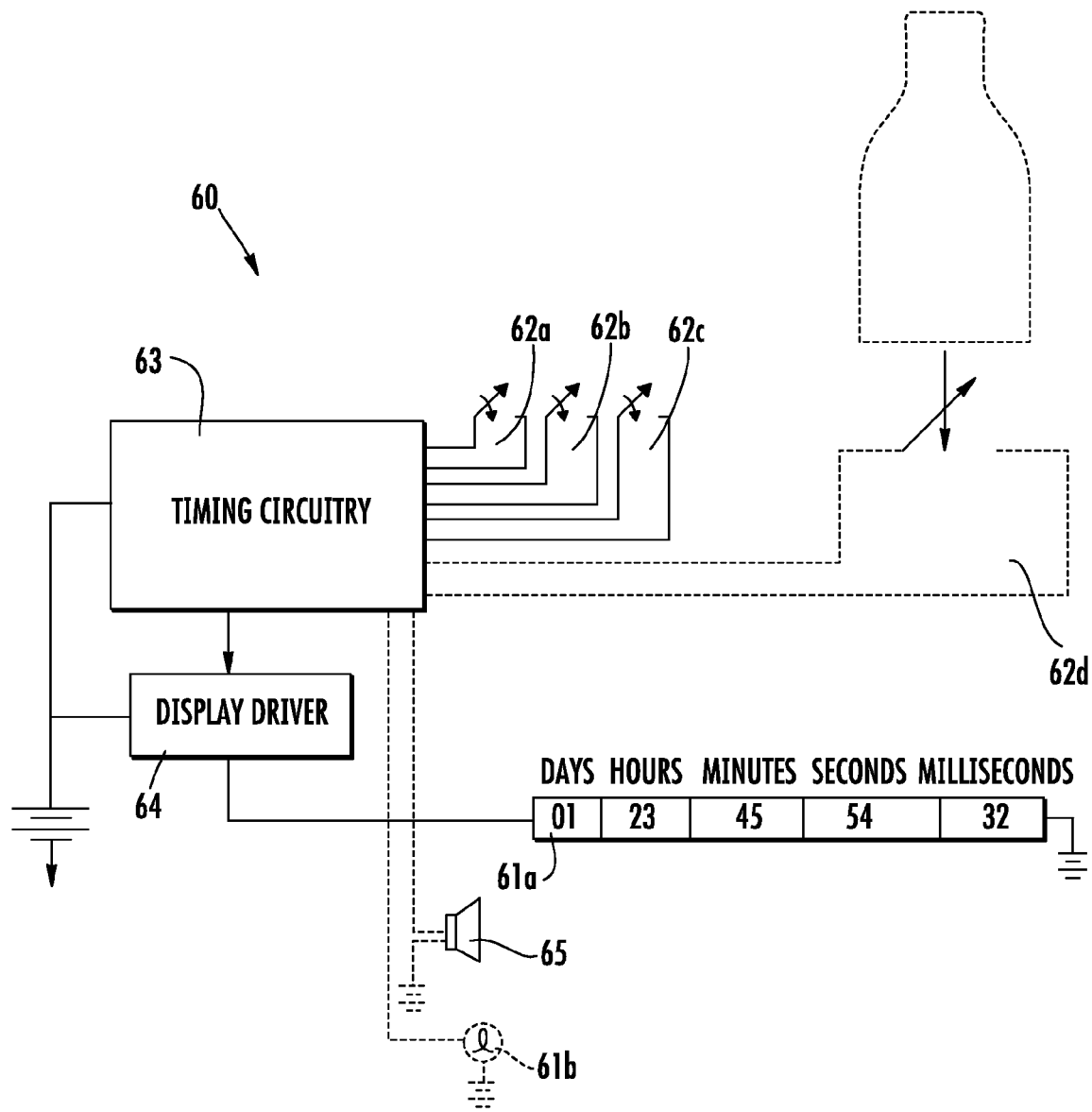
FIG. 2 is a schematic block diagram of the timer of the treatment device as shown in FIG. 1.

Referring initially to FIGS. 1 and 2, a treatment device 10 for magnetically treating liquid 16 in a liquid container 15 is now described. It will be readily understood by those skilled in the art that the liquid 16 may be a beverage, or an emollient, for example, or any other type of liquid as will be discussed in greater detail below. It will also be understood by those skilled in the art that the liquid 16 may be treated within a liquid container 15, as illustrated.

The device 10 illustratively includes a base 20 and a plurality of tubular members 30 extending upwardly from the base. The tubular members 30 are arranged in spaced-apart relation, defining the container holder that illustratively receives the liquid container 15 therebetween when the liquid container is positioned on the base 20. Additionally, in other embodiments, for example, there may be more than one liquid container 15 that can be treated simultaneously by the same treatment device 10.

The device 10 also includes a permanent magnet 40 within each of the tubular members 30 to generate a magnetic field within the liquid container 15 and, more particularly, within the liquid 16 in the liquid container. It shall be understood by those skilled in the art that the device 10 may be used to change characteristics of the liquid 16 by exposing the liquid to the magnetic field after it has been dispensed from the liquid container 15. For example, the device 10 may be used to treat emollient initially applied onto the hand of the user.

With respect to magnetically treating emollients, the characteristics of the emollient that may be changed, for example, include skin absorption and texture. An increase in skin absorption of the emollient may include an increase in the rate of skin absorption of the emollient into the skin of the user, for example. Also for example, an increase in skin absorption may include an increase in the amount of emollient that may be absorbed into the skin, as understood by those skilled in the art. Increasing skin absorption advantageously decreases a greasy, or oily, feel of an emollient, which may persist for some time after application, especially for emollients including lanolin.

It will be readily understood by those skilled in the art that an emollient may include any substance applied to the skin or hair for soothing or moisturizing purposes, for example. The emollient may, for example, be in the form of skin lotion, cream, cosmetic lotion, lip balm, lipstick, body washes, soaps, masks, cuticle oils, face care products, and hair care products, such as shampoos and conditioners, or any other type of emollient as will be understood by those skilled in the art.

The liquid container 15 may, for example, be a plastic container, bottle, or any other non-ferrous container that permits the magnetic field generated by the magnet 40 to penetrate therethrough and into the liquid 16. The device 10 could be sized to treat liquid 16 in any type of liquid container, as understood by those skilled in the art. In cases where the device 10 is used to magnetically treat a beverage, the liquid container 15 may, for example, be a shot glass, a standard 12-ounce aluminium can, a wine bottle, a liquor bottle, a juice box, a milk carton, or any other type of non-ferrous liquid container as understood by those skilled in the art. In these embodiments, the device 10 may be used to enhance the flavor of alcoholic beverages, but may also be used to enhance the flavor of citrus juice and dairy products, for example. It will be understood by those skilled in the art that a beverage includes any liquid consumable substance, such as the above-referenced citrus juice, dairy products, and alcoholic beverages as well as sauces and soups, for example.

The tubular members 30 are illustratively arranged along points of an imaginary cylinder, such as sized to receive the liquid container 15. In the illustrated embodiment, the tubular members 30 are fixed to the base 20. The tubular members 30 are illustrated as having a frusto-conical shape wherein an end having a larger diameter is positioned adjacent the base 20. Each of the tubular members 30 also illustratively includes a recess formed therein to receive accurate portions of the liquid container 15. The tubular members 30 can have other interior and exterior shapes as well. For example, the shapes may be oval, elliptical, generally polygonal, square, triangular, hexagonal, octagonal, rectangular, etc. as will be appreciated by those skilled in the art.

The base 20 and the tubular members 30 are integrally formed as a monolithic unit in some embodiments. Each of the tubular members 30 illustratively includes a permanent magnet 40 therein. The permanent magnet 40 may be provided by a plurality of permanent magnets. A magnetic field is created by the permanent magnets 40 so that the liquid 16 is exposed to the magnetic field when positioned between the tubular members 30.

The base 20 and the tubular members 30 may comprise nonmagnetic material, such as plastic material, for example. The permanent magnets 40 preferably comprise neodymium, but may be provided by any magnetic material, such as a ceramic block magnet, alnico, and samarium cobalt, as understood by those skilled in the art.

The base 20 illustratively has a generally polygonal shape in the form of a square. In other embodiments, the base 20 may include other polygonal shapes as understood by those skilled in the art.

A treatment timer 60 is associated with the container holder to time a duration of treatment of liquid 16 within the liquid container 15. The treatment timer 60 may additionally function as a clock or a stopwatch. The treatment timer 60 may time the duration the liquid container 15 has been in the container holder. The treatment timer 60 may count upward to a designated treatment time. Alternatively, the treatment timer 60 may count downward from a designated treatment time.

The designated treatment time may be user programmable, for example. There may be different selectable values that correspond to different liquids, so that a user could select wine, for example, and the treatment timer would count upward to or downward from the set value for wine treatment. Alternatively, there may be different user selectable values that do not correspond to different liquids, but rather are set periods of time (ie. 8 hours or 16 hours). The user may select whether the treatment timer counts upward or downward, for example The treatment timer 60 has an indicator, illustratively a visual indicator 61, coupled thereto to display the duration of treatment. It will be understood by one skilled in the art that the indicator could additionally or alternatively comprise an audible indicator, a tactile indicator, or any other type of indicator. The indicator may indicate that treatment has begun or that no treatment time remains and the liquid is ready for use or consumption.

The visual indicator 61 may be considered as generating visual interest and entertainment for the user. The visual indicator 61 displays at least one of days, hours, minutes, seconds, and milliseconds. The visual indicator 61 may display incrementing or decrementing values of the days, hours, minutes, seconds, and milliseconds to indicate the treatment time. Moreover, the visual indicator 61 may display the time of the day when not being used as a timer for treatment.

The treatment timer 60 has switches 62*a*, 62*b*, 62*c* to assist a user in timing a duration of treatment of liquid 16 within the liquid container 15. The switches 62*a*-62*c* may be manually activated or may be activated by proximity, light or darkness, sounds, or any other method of switch activation.

Switch 62*a* is start/stop switch to start or stop the timing of the duration of treatment. Switch 62*b* is a pause switch to pause the timing of the duration of treatment. Switch 62*c* is a reset switch to reset the timing of the duration of treatment.

It will be understood by those skilled in the art that the treatment timer 60 may have any number of switches 62*a*-62*c* or that the treatment timer may have no switches in some embodiments. The switches 62*a*-62*c* may have other additional functions than those listed above, for example a clock switch to display the time of the day. The switches 62*a*-62*c* may permit programming to enable a user to choose a set treatment time, or the switches may enable the user to designate any treatment time he would like. The switches 62*a*-62*c* may select whether the treatment timer 60 counts upward to a designated treatment time or whether the treatment timer counts downward from a designated treatment time. The switches 62*a*-62*c* may turn the indicator on or off or may alter properties of the indicator such as volume, color, font, language, or brightness.

The switches 62*a*-62*c* may be carried by any portion of the treatment device 10. For example, the switches 62*a*-62*c* may be carried by the base 20 or the tubular members 30.

Referring now more particularly to FIG. 2, the treatment timer 60 includes timing circuitry 63. A display driver 64 is coupled to the timing circuitry 63. The visual indicator 61*b* is coupled to the display driver 64. Manually activated switches 62*a*, 62*b*, and 62*c* are coupled to the timing circuitry 63. Present in some embodiments may be switch 62*d* which is activated based upon movement of the liquid container 15. Present in some embodiments may be an audio indicator 65 coupled to the timing circuitry 63 to alert the user. Likewise, some embodiments may include a visual indicator 61*b*, comprising a light coupled to the timing circuitry 63.

Figure 3:
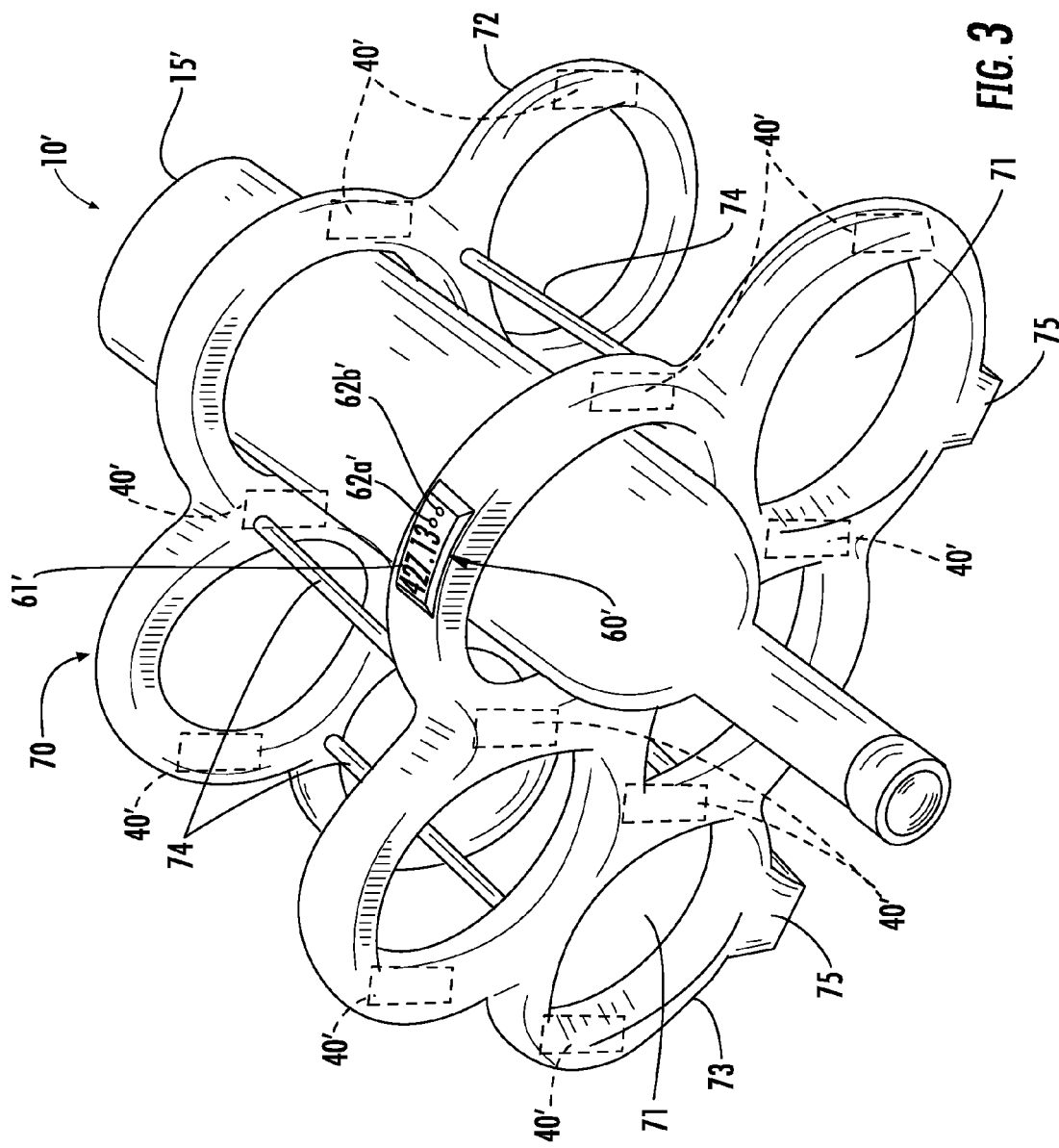
FIG. 3 is a perspective view of another embodiment of a treatment device for magnetically treating liquid in accordance with the present invention.

Referring to FIG. 3, another embodiment of a liquid treatment device 10' in accordance with the invention is now described. The liquid treatment device illustratively includes a rack 70 defining a plurality of liquid container holding positions 71 for holding liquid containers in a generally horizontal orientation, one such liquid container 15' being illustrated for clarity of explanation. The treatment device 10' also includes a plurality of permanent magnets 40' carried by the rack 70 for causing a magnetic field in the liquid container holding positions 71.

The rack 15 illustratively defines the plurality of liquid container holding positions 71 in lower and upper vertically stacked courses. For enhanced stability, the vertically stacked courses have a decreasing number of liquid container holding positions from lower to higher courses. In the illustrated embodiment, the lower course has three side-by-side container holding positions, and the upper course has two side-by-side holding positions. As also shown in the illustrated embodiment, adjacent ones of the vertically stacked courses may be nested for additional compactness and stability. This configuration of decreasing holding positions 71 and/or nesting can be extended to greater than the two illustrated courses as will be appreciated by those skilled in the art.

The rack 70 includes a pair of spaced apart first and second frames 72, 73 and a plurality of struts 74 interconnecting the first and second frames. The first and second frames 72, 73 each comprise a plurality of rings joined together at adjacent peripheral portions thereof. For ease and efficiency of manufacturing, the first and second frames 72, 73 and the interconnecting struts 74 may comprise integrally molded plastic. The rack 70 also includes a plurality of feet 75 depending from lowermost portions of the first and second frames 72, 73.

The plurality of permanent magnets 40' illustratively includes a first set of permanent magnets carried by the first frame 72, and a second set of permanent magnets carried by the second frame 73. Of course in other embodiments, the magnets 40' may not be needed in association with both of the frames.

A treatment timer 60' is carried by the first frame 72 and includes a visual indicator 61'. It will be understood by those skilled in the art that either the treatment timer 60' or the visual indicator 61' could be carried by the second frame 73, the struts 74, the feet 75, or any other part of the treatment device 10'. The treatment timer 60' may illustratively includes a pair of switches 62*a*, 62*b* associated therewith.

Figure 4:
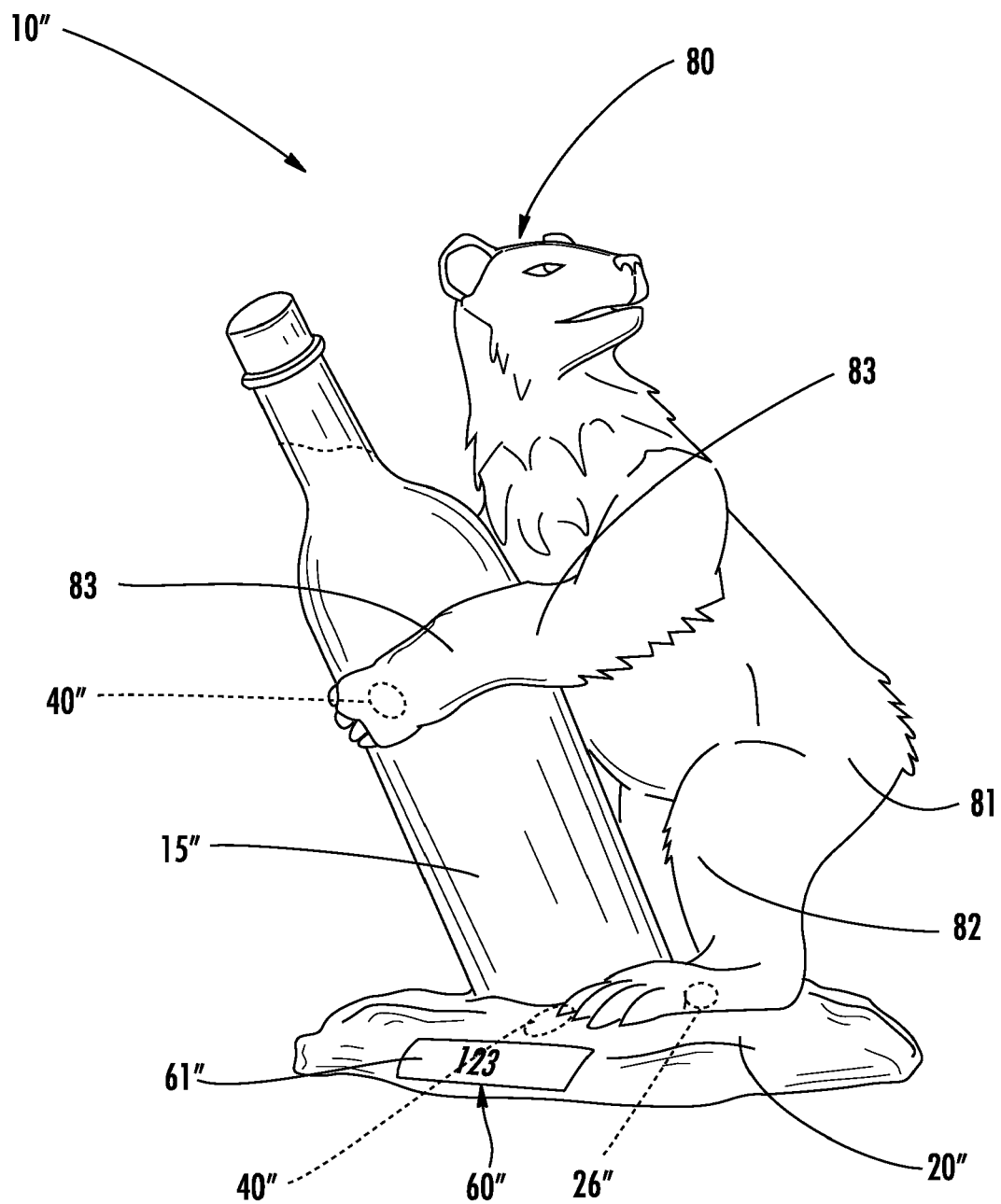
FIG. 4 is a perspective view of yet another embodiment of a treatment device for magnetically treating liquid in accordance with the present invention.

Referring to FIG. 4, yet another embodiment of a liquid treatment device 10" for magnetically treating liquid within a liquid container 15" is now described. The treatment device 10" comprises a figurine 80, illustratively of a bear, having a body portion 81 and four limbs, for example, extending outwardly therefrom. In other words, the figurine 80 may be of an animal and impart a fanciful appearance to the treatment device 10" as will be appreciated by those skilled in the art. The figurine 80 may be configured to define the container holder. It will be appreciated by those skilled in the art that, in other embodiments, the treatment device 10" could include more than one figurine 80.

The limbs comprise a pair of (hind) legs 82 and a pair of front legs or arms 83, each limb having a distal end. One arm 83 partially encircles the liquid container 15". A permanent magnet 40" is illustratively carried by the distal end of the arm 83 partially encircling the container 15" to expose the liquid within the liquid container 15" to the magnetic field. In this and other embodiments, the limbs could be arranged to treat two or more side-by-side liquid containers, or even liquid containers spaced from each another, as will be appreciated by those skilled in the art.

More than one magnet 40" may be carried by the distal end of the arm 83, or by any limb adjacent the liquid container 15", as will be appreciated by those skilled in the art. A base 20" illustratively supports both the figurine 80 and the liquid container 15". Other embodiments may not include a base 20", and the liquid container 15" may rest on the same surface that the figurine 80 rests on, such as a table-top, for example.

A treatment timer 60" is carried by the figurine 80 and includes a visual indicator 61" therewith. It will be appreciated by those skilled in the art that either the treatment timer 60" or the visual indicator 61" could be carried by the body portion 81, legs 82, arms 83, base 10", or any other part of the treatment device 10". In other embodiments, the treatment timer 60" may have at least one switch associated therewith. The at least one switch could be carried by the body portion 81, legs 82, arms 83, base 10", or any other part of the treatment device 10".

Other embodiments utilizing the treatment timer 60 are disclosed in the co-pending application entitled Treatment Device For Cooling And Magnetically Treating Liquid Within A Container And Associated Methods, which is incorporated herein by reference in its entirety.

Many modifications and other embodiments of the invention will come to the mind of one skilled in the art having the benefit of the teachings presented in the foregoing descriptions and the associated drawings.

Therefore, it is understood that the invention is not to be limited to the specific embodiments disclosed, and that modifications and embodiments are intended to be included within the scope of the appended claims.

That which is claimed is:

1. A treatment device for magnetically treating liquid in a liquid container comprising:
    a container holder to receive the liquid container;
    at least one permanent magnet associated with said container holder to generate a magnetic field within the liquid in the liquid container; and
    a treatment timer associated with said container holder.

2. A treatment device according to claim 1 wherein said treatment timer comprises:
    timer circuitry; and
    at least one switch cooperating with said timer circuitry to assist a user in timing a duration of treatment of liquid within the liquid container.

3. A treatment device according to claim 2 wherein said at least one switch comprises at least one of a start/stop switch and a reset switch.

4. A treatment device according to claim 2 wherein said at least one switch comprises at least one manually activated switch.

5. A treatment device according to claim 2 wherein said at least one switch comprises at least one switch activated based upon movement of the liquid container.

6. A treatment device according to claim 2 wherein said timer further comprises at least one indicator coupled to said timer circuitry.

7. A treatment device according to claim 6 wherein said at least one indicator comprises an audible indicator.

8. A treatment device according to claim 6 wherein said at least one indicator comprises a visual indicator.

9. A treatment device according to claim 8 wherein said visual indicator displays at least fractions of a second.

10. A treatment device according to claim 1 wherein said container holder comprises a base and a plurality of members extending upwardly from the base and arranged in spaced-apart relation to receive the container.

11. A treatment device according to claim 10 wherein said at least one permanent magnet comprises a plurality thereof; and wherein each of said plurality of members carries a respective one of said plurality of permanent magnets.

12. A treatment device according to claim 10 wherein said base carries said at least one permanent magnet.

13. A treatment device according to claim 1 wherein said container holder comprises a rack defining a plurality of container holding positions for holding a plurality of liquid containers.

14. A treatment device according to claim 13 wherein said at least one permanent magnet comprises a plurality thereof; and wherein each of said plurality of container holding positions carries a respective permanent magnet of the plurality thereof.

15. A treatment device according to claim 1 wherein said container holder comprises at least one figurine.

16. A treatment device according to claim 15 wherein said at least one figurine comprises a body portion and at least one limb extending outwardly therefrom; and wherein said at least one permanent magnet is carried by at least one of said body portion and said at least one limb.

17. A treatment device for magnetically treating liquid in a liquid container comprising:
    a container holder to receive the liquid container;
    at least one permanent magnet associated with said container holder to generate a magnetic field within the liquid in the liquid container;
    a treatment timer associated with said container holder and comprising
    timer circuitry,
    at least one switch cooperating with said timer circuitry to assist a user in timing a duration of treatment of liquid within the liquid container, and
    at least one indicator coupled to said treatment timer.

18. A treatment device according to claim 17 wherein said at least one switch comprises at least one of a start/stop switch and a reset switch.

19. A treatment device according to claim 17 wherein said at least one switch comprises at least one manually activated switch.

20. A treatment device according to claim 17 wherein said at least one switch comprises at least one switch activated based upon movement of the liquid container.

21. A treatment device according to claim 17 wherein said at least one indicator comprises at least one of an audible indicator and a visual indicator.

22. A treatment device according to claim 17 wherein said indicator displays at least fractions of a second.

23. A treatment device according to claim 17 wherein said container holder comprises a base and a plurality of members extending upwardly from the base and arranged in spaced-apart relation to receive the container.

24. A treatment device according to claim 17 wherein said container holder comprises a rack defining a plurality of container holding positions for holding a plurality of liquid containers.

25. A treatment device according to claim 17 wherein said container holder comprises at least one figurine.

26. A method for making a treatment device for magnetically treating liquid in a liquid container, the method comprising:
    configuring a container holder to receive the liquid container;
    associating at least one permanent magnet with the container holder to generate a magnetic field within the liquid in the liquid container; and
    associating a treatment timer with the container holder.

27. A method according to claim 26 wherein the treatment timer comprises timer circuitry and at least one switch cooperating with the timer circuitry to assist a user in timing a duration of treatment of liquid within the liquid container.

28. A method according to claim 27 wherein the at least one switch comprises at least one of a start/stop switch and a reset switch.

29. A method according to claim 27 wherein the at least one switch comprises at least one manually activated switch.

30. A method according to claim 27 wherein the at least one switch comprises at least one switch activated based upon movement of the liquid container.

31. A method according to claim 27 wherein the timer further comprises at least one indicator coupled to the timer circuitry.

32. A method according to claim 26 further comprising supporting the container holder on a base and configuring a plurality of members to extend upwardly from the base in a spaced-apart relation to receive the container.

33. A method according to claim 32 wherein associating at least one permanent magnet with the liquid container comprises associating a plurality of permanent magnets with the liquid container by placing one of the plurality of permanent magnets in each of the plurality of members.

34. A method according to claim 32 wherein associating the at least one permanent magnet with the liquid container is performed by placing the at least one permanent magnet in the base.

35. A method according to claim 26 wherein configuring the container holder comprises configuring a rack to define a plurality of container holding positions for holding a plurality of liquid containers.

36. A method according to claim 35 wherein associating the at least one permanent magnet with the liquid container comprises associating a plurality of permanent magnets with the liquid container by placing one of the plurality of permanent magnets in each of the plurality of container holding positions.

37. A method according to claim 26 wherein the container holder comprises at least one figurine.

38. A method according to claim 37 wherein the at least one figurine comprises a body portion and at least one limb extending outwardly therefrom; and wherein associating the at least one permanent magnet with the liquid container comprises placing the at least one permanent magnet in at least one of the body portion and the at least one limb.

* * * * *